United States Patent [19]
Gardner

[11] 3,837,486
[45] Sept. 24, 1974

[54] ARTICLE INSPECTION SYSTEM

[75] Inventor: Edward Boyd Gardner, Bloomfield, Conn.

[73] Assignee: Emhart Corporation, Bloomfield, Conn.

[22] Filed: July 9, 1973

[21] Appl. No.: 377,807

[52] U.S. Cl. ............................................. 209/111.7
[51] Int. Cl. ............................................ B07c 5/342
[58] Field of Search ............................ 209/82, 111.7

[56] References Cited
UNITED STATES PATENTS

| | | | |
|---|---|---|---|
| 3,327,850 | 6/1967 | Simmons | 209/111.7 |
| 3,455,444 | 7/1969 | Simmons | 209/111.7 X |
| 3,549,890 | 12/1970 | Keller | 209/111.7 X |
| 3,669,263 | 6/1972 | Babb | 209/111.7 X |

Primary Examiner—M. Henson Wood, Jr.
Assistant Examiner—Gene A. Church
Attorney, Agent, or Firm—McCormick, Paulding & Huber

[57] ABSTRACT

At least one light beam is directed across a continuously moving conveyor toward a light sensitive device arranged on the opposite side of the conveyor, and circuitry is provided in association with the light sensitive device to provide a "diameter" pulse proportional in real time to the width or diameter of the article passing along the conveyor. A pulse generator provides a train of pulses proportional in frequency to the speed of the conveyor and hence to the speed of the articles moving thereon. NAND gate means clips the train of pulses providing a series of pulses with a total time span corresponding to the real time duration of the "diameter" pulse. A counter receives these pulses, and has preset minimum and maximum values, which values when exceeded will generate "yes" and "no" pulses to logic circuitry for operation of a reject device downstream of the light beam for removing an article from the line when it does not meet predetermined standards.

7 Claims, 2 Drawing Figures

ARTICLE INSPECTION SYSTEM

SUMMARY OF THE INVENTION

This invention relates generally to article inspection apparatus, and deals more particularly with a simplified apparatus capable of checking articles for proper shape or silhouette as these articles are continuously moved by a conveyor through an inspection station.

In carrying out the present invention in the foregoing environment a pulse generating means is adapted to produce a train of pulses proportional in frequency to the speed of the conveyor, and hence to the speed of the articles moving through the inspection station. Transducer means is mounted adjacent the conveyor and generates a "diameter" pulse having a duration proportional to the width or diameter of the article being inspected. Counter means is provided for recording the number of pulses produced during the duration of said "diameter" pulse, and means is provided in association with the counter to produce discrete "yes" and "no" output pulses when the count provided in the counter is above predetermined minimum and maximum values. Reject means is operable in response to these "yes" and "no" output signals for removing a defective article from the conveyor at a reject station, which station may be provided at the inspection station or downstream thereof.

DETAILED DESCRIPTION

Figure 1:
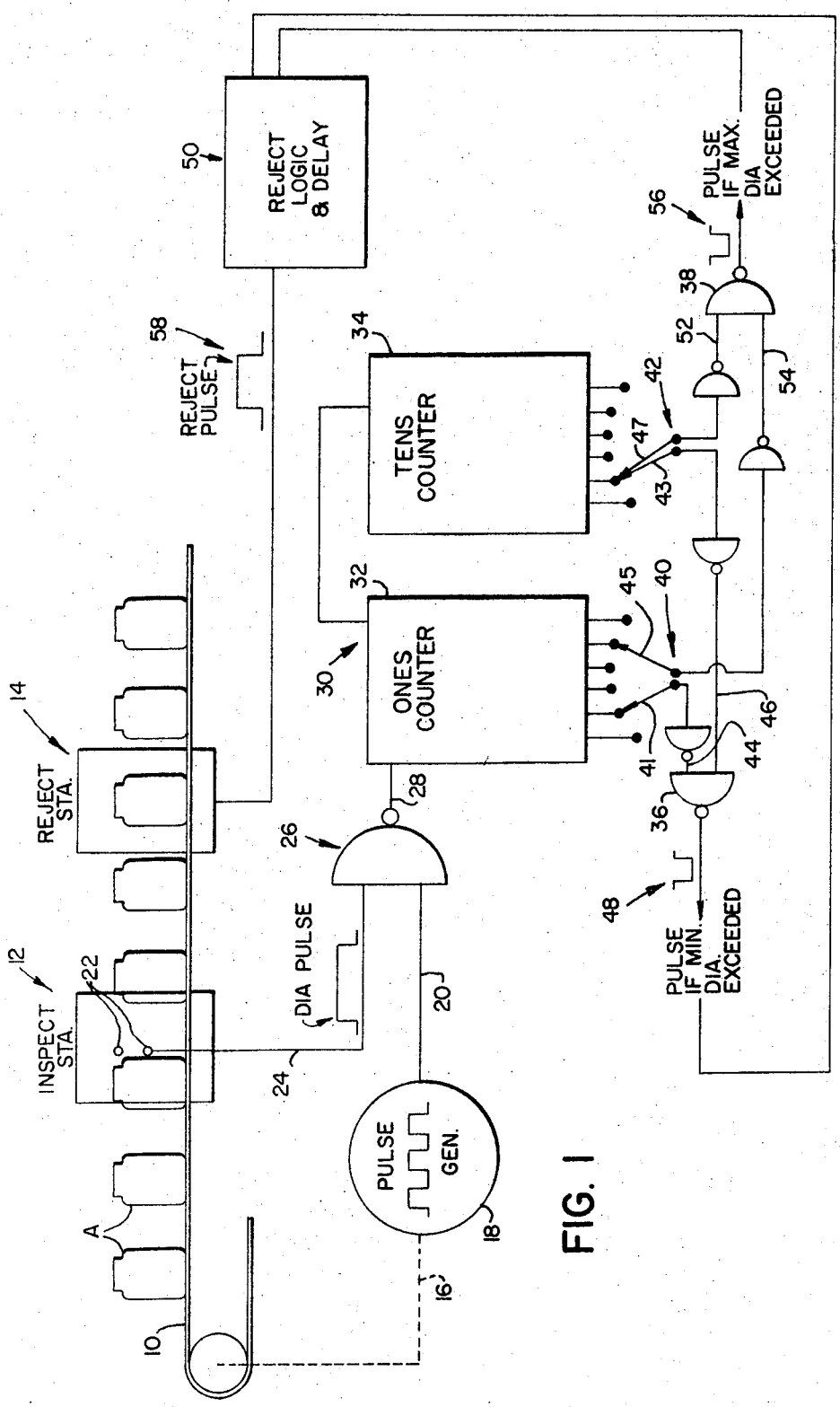
FIG. 1 is a schematic view of a system which incorporates the present invention.

Turning now to the drawings in greater detail, FIG. 1 shows a conveyor 10 which is adapted to be continuously operated by a source of power (not shown) which conveyor is of conventional construction but preferably has a relatively constant speed so as to permit taking advantage of the present invention to be described.

Articles to be inspected are provided on the conveyor, and are arranged in spaced relationship to one another, although the actual spacing between the articles need not be precise as in some prior art arrangements. These articles A, A are conveyed by the conveyor 10 through an inspection station 12 and thence travel downstream through a rejection station 14, the acceptable articles proceeding onward for further processing. While the reject station may be provided in conjuction with the inspection station it has been found more desirable to arrange the reject station downstream of the inspection station, and to provide a memory device for storing a reject signal, indicative of a defective article, for recall at a later instant of time to operate the reject mechanism.

The conveyor 10 is used to provide a mechanical input 16 to a conventional pulse generator 18, which pulse generator will be seen to provide a train of pulses in the line 20, proportional in frequency to the speed of movement of the conveyor 10, and hence of the articles A, A through the inspection station 12. Thus, each pulse in the train of pulses represents a unit of linear measure in the system to be described.

The inspection station preferably comprises at least one light source (not shown) which is adapted to direct a beam of light toward at least one light sensitive device 22, and one of these light sensitive devices 22 is connected through line 24 to gate means 26. Although a photocell on one side of the conveyor, used in conjuction with a light source on the opposite side, is one preferred form of inspection station it will be apparent that other arrangements of transducer means might be used to produce a signal in the line 24. For example, if the article projected beyond the edge of the conveyor the photocell might be adapted to receive a vertical light beam. The article itself might also engage a limit switch to close it for a length of time dictated by the article's girth. A proximity switch adjacent the path of the articles might also be used to produce such a pulse.

The line 24 thus provides a stretched pulse referred to as a "diameter" pulse, which pulse has a duration in real time proportional to the width or diameter of the article A undergoing inspection. NAND gate 26 permits the gating of the "diameter" pulse, with the train of pulses from the pulse generator, to provide an output in line 28, which output in turn comprises a train of pulses clipped by the gate 26 to be of predetermined duration. The number of pulses in the train will be proportional to the distance the article is conveyed during the "diameter" pulse.

This clipped or gated train of pulses is fed to a conventional counter, indicated generally at 30. As shown the counter 30 includes a "ones" and "tens" segment, 32 and 34 respectively. These counter segments are periodically reset to zero in a conventional fashion by timing out, or by other suitable means, and each includes switch means 40 and 42 for presetting the count value at which the "ones" and "tens" counter segments, 32 and 34, respectively, will provide an output pulse. Selector switch means 40 and 42 comprise individual wiper arms, or movable portions 41, 45 and 43, 47 respectively.

From FIG. 1 of the drawings, it will be apparent that when an article has a diameter or width which exceeds the minimum preset value of wiper arms, 41 and 43 respectively, signals are provided in the lines 44 and 46 to generate a pulse 48, which pulse 48 is fed to the reject device indicated generally at 50. Similarly, when an article has a width or diameter which exceeds the preset value as determined by wiper arms 45 and 47, signals will be provided in the lines 52 and 54 providing a oulse 56 to the reject device 50. On the other hand, if an article has a width or diameter which falls between these values, the lines 52, 54 will fail to provide a signal 56 to the reject device 50 through the NAND gate 38. So too, if an article has a width or diameter which is less than the minimum preset value or count, then the lines 44 and 46 will fail to provide a signal 48 to the reject device 50 through NAND gate 36.

The reject device 50 includes appropriate logic circuitry for producing no reject pulse output 58 only in response to the presence of a signal 48 and absence of a signal such as 56. If any other combination of signals is present in the two input lines to this reject logic, a reject pulse 58 is generated. It will be apparent that the reject pulse 58 can be provided after a predetermined delay, controlled for example, by the pulse generator 18 as is conventional practice. The reject station 14 includes a conventional air nozzle, or other push off device, for removing a defective article from the line whenever a reject pulse is provided from the device 50.

Acceptable articles will continue to move along the conveyor 10 for further processing or handling.

Figure 2:
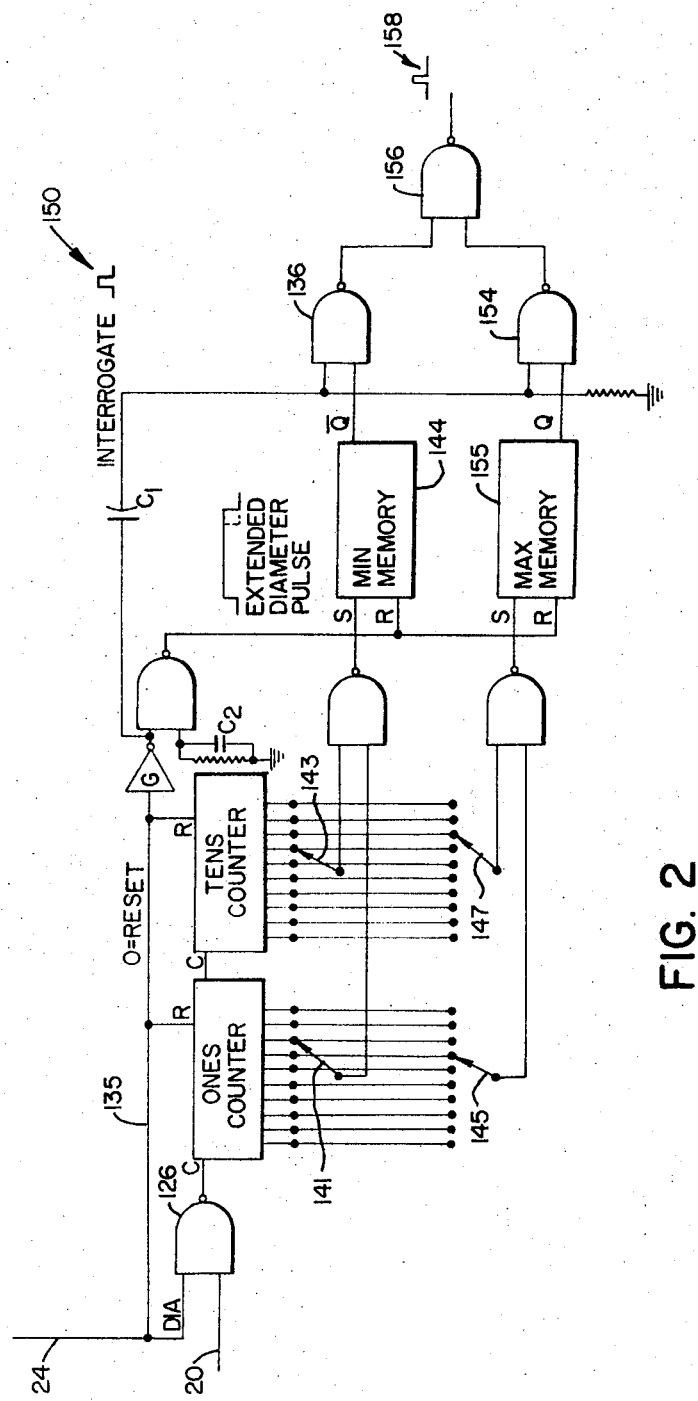
FIG. 2 is a schematic view of an alternative embodiment.

From FIG. 2 of the drawings, it will be apparent that when an article has a diameter which is less than the minimum count preset at 141 and 143, the MIN memory 144 will not be set and its $\overline{Q}$ output then conducts a pulse to NAND gate 136. Since a diameter pulse or signal is present in line 24, reset line 135 also conducts a pulse through amplifier G and capacitor C, to NAND gate 136. This is referred to as an interrogate pulse 150 in FIG. 2, and provides a reject pulse 158 through NAND gate 136.

Still with reference to FIG. 2, an article above the preset minimum count will result in the MIN memory 144 being set, but no $\overline{Q}$ output will be provided for NAND gate 136. If the article diameter is below the preset maximum count MAX memory 155 will not be set and no output Q will be privided for NAND gate 154. The interrogate pulse 150 then finds NAND gate 154 and NAND gate 136 will not have conducted so no reject pulse 158 can occur. However, if the article was large enough to have produced a diameter pulse count exceeding the preset maximum value then MAX memory 152 would then have its Q output combined with the interrogate pulse 150 to cause NAND gate 154 to conduct and through NAND gate 156 a reject pulse 158 occurs.

The logic circuitry of FIG. 2 thus differs from that of FIG. 1 only in that the counter reset is held at zero except when a diameter pulse or signal is present. This feature has the effect of holding the counters in their zero condition, holding the MIN memory 144 output $\overline{Q}$ high (one), and holding the MAX memory 152 output Q low (zero). As a result of the FIG. 2 logic, a reject pulse will be produced when the following logic is satisfied:

| MIN | MAX | |
|---|---|---|
| X | O | ACCEPT |
| X | X | REJECT |
| O | O | REJECT |

I claim:

1. An in-line inspection device comprising a moving conveyor for advancing articles in randomly spaced relation, pulse generating means driven directly by the moving conveyor to provide a train of pulses proportional in number to the displacement of the conveyor, stationary transducer means for generating a signal in response to the passage of an article on said conveyor, said signal from said transducer means having a duration dictated by the actual displacement of the conveyor necessary to advance an article past said stationary transducer means, counter means for counting the number of pulses produced during the duration of said signal, logic means including preset switch means for providing a reject signal when the pulse count does not fall within a predetermined range of numbers, and reject means downstream of said transducer means and operable in response to said reject signal.

2. The combination set forth in claim 1 wherein said switch means includes means for presetting a minimum predetermined number, and said logic means providing a first output signal generated when said preset minimum number of pulses is exceeded.

3. The combination set forth in claim 1 wherein said switch means includes means for presetting a maximum predetermined number, and said logic means providing a second output signal generated when said preset maximum number of pulses is exceeded.

4. The combination set forth in claim 2 wherein said switch means further includes means for presetting a maximum predetermined number, and said logic means generating a second output signal when said preset maximum number of pulses is exceeded.

5. The combination set forth in claim 4 wherein said logic means includes circuitry for operating said reject means every time an article passes said reject means except when the aforementioned first output signal was generated and no second output signal was generated.

6. The combination set forth in claim 4 wherein said logic means includes NAND gate means for gating the pulses produced by said pulse generator in response to the duration of said transducer signal.

7. The combination set forth in claim 5 further characterized by said counter means including a "ones" and a "tens" segment, and said logic means including a NAND gate circuit to provide said first and second output signals.

* * * * *